Nov. 17, 1959  Q. R. WHITMORE  2,912,820
COMBINED RAM JET AND ROCKET ENGINE
Filed July 31, 1953

INVENTOR
Quentin R. Whitmore
BY
Walter S. Paul
ATTORNEYS

United States Patent Office 2,912,820
Patented Nov. 17, 1959

2,912,820

COMBINED RAM JET AND ROCKET ENGINE

Quentin R. Whitmore, Wayne, Nebr., assignor to the United States of America as represented by the Secretary of the Navy Application July 31, 1953, Serial No. 371,739

2 Claims. (Cl. 60—35.6)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in engines, particularly those used to power aircraft such as airplanes, missiles and others.

At the present time ram jet powered vehicles are either air launched or ground launched with rocket boosters. It has been difficult to make a ram jet powered vehicle accelerate from the air launched speeds, and the total weight of a ground launched ram jet vehicle with its rocket boosters is extremely high. Moreover, two separate engines, that is ram jet and rocket, increase the logistic problem. Accordingly, an object of this invention is to provide a combined ram jet-rocket engine in a single engine casing having the beneficial operational qualities of each engine but a total weight considerably less than the total weight of two separate conventional engines.

Another object of the invention is to provide a combined ram jet-rocket engine having two chambers separated by a partition wall which changes its state, that is, burns, melts, vaporizes etc. in response to heat at temperatures at which rocket fuel burns so that the rocket engine portion may be disposed in the aft part of the engine casing and when its fuel is expended, the partition may be destroyed by the rocket heat thereby connecting the chambers, both chambers then serving as a part of the ram jet which was formerly confined in the forward chamber in advance of the partition.

A feature of the invention noted specifically is the use of the discharge nozzle for the rocket engine and ram jet aspects of operation. Since the demands made on the nozzle in ram jet operations and rocket operation are different, the nozzle is made with a fusible or otherwise volatile liner which is destroyed in response to continual application of rocket fuel buring heat. Therefore, a nozzle is provided which increases its area in time for ram jet operations. The material of the liner is the same as that of the partition, and there are many to choose from such as brass, aluminum, some plastics or various combinations of materials. Moreover, a metal could be used, with an oxidizer in it to control the rate of vaporization and/or its ignition point. In the final analysis, the time of rocket operation will dictate the properties desired and hence, the type of metal to be used.

Other objects and features will become apparent in following the description of the illustrated forms of the invention.

Figure 1:
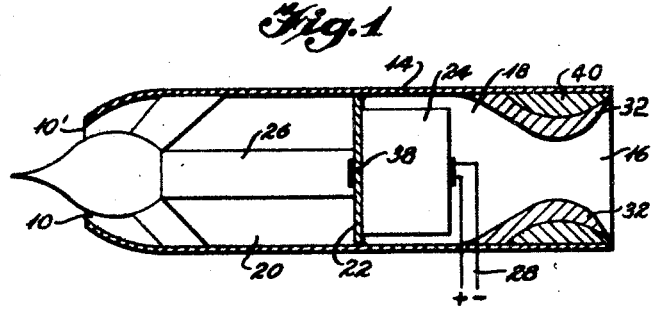
Fig. 1 is a longitudinal sectional, largely schematic view of one form of the invention.
Figure 2:
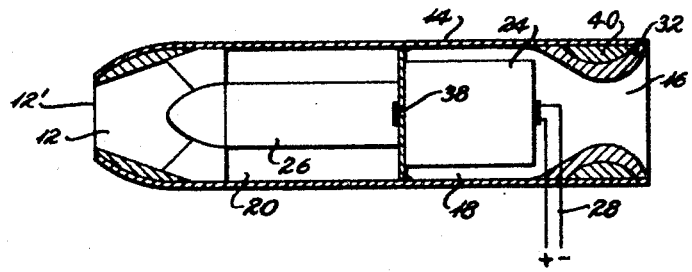
Fig. 2 is an longitudinal sectional view of another form of the invention, portions being shown schematically.

In Fig. 1 and Fig. 2, two embodiments of the invention illustrate the adaption thereof to supersonic (Fig. 1) or subsonic (Fig. 2) operations, the distinctions being illustrated in the inlet diffusers 10 and 12 respectively. Each of these embodiments are otherwise identical and includes an engine casing 14 provided with an air inlet 10' and 12' respectively. Engine casings 14 have discharge nozzles 16 in alignment with their respective air inlets, and located at the aft end of castings 14.

The engine casing 14 is separated into two chambers 18 and 20 respectively by means of a partition 22 which extends transversely of casing 14 intermediate the air inlet and discharge opening. Chamber 18 contains means 24 for burning rocket fuel while chamber 20 contains ram jet fuel burning apparatus 26, the fuel burning means 24 and apparatus 26 being structurally known.

In operation the fuel of the rocket fuel burning means 24 is ignited by any standard method, as by an electrical charge delivered through schematically shown wiring 28, and the rocket fuel burns with its products of combustion passing through nozzle 16. Thus, the engine casing is thrust forward without affecting the ram jet nature of the engine. While the rocket fuel continues to burn, the various walls of chamber 18 became heated, melting, burning, vaporizing or otherwise reducing the partition 22 to connect chambers 18 and 20. As soon as the first break in partition 22 occurs, air passes through the air inlet since an air flow path is established for the first time between air inlet and discharge outlet.

Where desired or required by the capacities of the ram jet and rocket natures of the engine, discharge nozzle 16 is provided with a liner 32 of substantially the same material as partition 22 so that when the rocket fuel burning means have exhausted or nearly exhausted their fuel supply, the liner 32 is removed thereby enlarging the area of the nozzle 16 for ram jet engine operation.

When flow is established through the entire casing by destruction of partition 22, the conditions for efficient ram jet operation are present, and actuation of fuel burning apparatus 26 is all that is necessary. This takes place by utilization of the heat of the rocket fuel conducted by partition 22. Either a pyrostat system as in Fig. 3, or direct heat transfer may be used. In Figs. 1 and 2 the latter method is employed since the ram jet fuel burning means is of the type that handles solid fuel, and a percussion cap 38 is all that is necessary to initiate ram jet fuel burning if the cap is close or touching partition 22. Thus, at take off, the rocket nature of the engine is put to use, where there is high fuel consumption but very high thrust available. After accelerating, the ram jet feature of the engine comes into use deriving the benefit of the excellent specific fuel consumption thereof.

Figure 4:
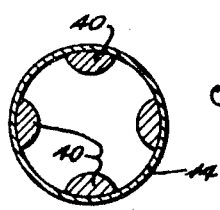
Fig. 4 is a transverse sectional view taken on the exhaust side of the partition separating the chambers in the engine, after destruction of the partition and liner, illustrating the remaining turbulence promoting projections in the engine exhaust nozzle.
Figure 5:
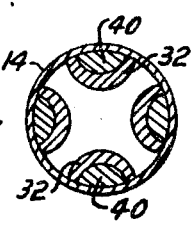
Fig. 5 is a transverse sectional view taken along line 5—5 of Fig. 3.

Useful and optional in all forms of the invention is the feature depicted in Fig. 4, that is, the turbulence producing means in the form of projections 40 that extend inwardly of the casing 14 after the partition 22 is reduced in the ways previously specified. Projections 40 are vanes made of metal similar to that of the engine casing and withstand the rocket fuel burning heat even though the remainder of partition 22 does not. These projections 40 are clearly shown in each of the figures of the drawing. Accordingly, partition 22 may be made entirely of metal which is volatilized at or slightly below the temperature at which rocket fuel burns or it may be made partly of such material and partly of metal capable of withstanding greater heat with the result of leaving turbulence vanes for the air-fuel mixture as it passes through the casing.

Figure 3:
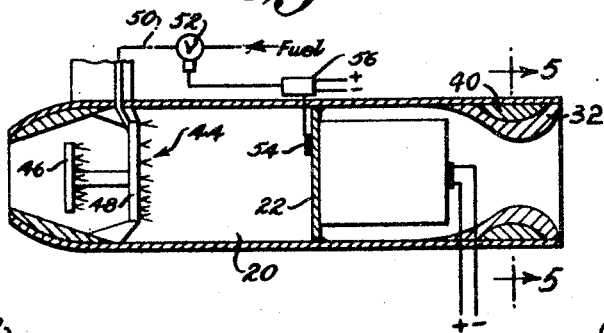
Fig. 3 is a longitudinal sectional view of a third form of the invention.

Attention is invited now to Fig. 3 where the illustrated engine is in essence the same as that of Fig. 2. The distinction lies in the specific ram jet fuel burning apparatus 44, in that it uses liquid fuel. Burners 46 and 48 are disposed in the forward part of the chamber 20, and a conduit 50 feeds fuel thereto from a suitable source. Valve 52 in conduit 50 controls the delivery of fuel to burners 46 and 48, and this valve is operated electrically as governed by the heat of or near partition 22 where pyrostat or thermostat 54 is disposed, the latter supplying information to switch 56 which is connected to valve 52. Otherwise, the operation and structure of the embodiment of Fig. 3 is the same as that of Fig. 2.

It is apparent that variations of the invention may be made without departing from the following claims.

What is claimed is:

1. A combined ram jet and rocket engine comprising an engine casing provided with an air inlet at one end and an exhaust outlet at the other end, a discharge nozzle in said outlet, rocket fuel burning means upstream of said nozzle, a partition separating said casing into upstream and downstream chambers, the downstream chamber containing said fuel burning means, said partition being of a material destructible by the heat generated in the burning of rocket fuel thereby connecting said chambers and thus making the nozzle common to both of said chambers, ram jet fuel burning apparatus in said upstream chamber and means to be actuated when said rocket fuel burning means has exhausted its fuel supply for actuating said ram jet apparatus, said ram jet actuating means comprising a percussion cap in contact with said partition in the upstream chamber, said nozzle receiving gases exhausted through said engine and having a liner of material similar to that of said partition whereby said liner burns at the same time as said partition and the cross-sectional area of said nozzle is increased when said engine acts as a ram jet.

2. The engine of claim 1 and; a plurality of projections in the outlet extending from the casing into said liner and extending inwardly within said casing, said projections being comprised of metallic vanes formed of metal similar to that of the casing, whereby upon the destruction of said liner, the projections violently agitate the exhaust gases passing through said nozzle.

References Cited in the file of this patent

UNITED STATES PATENTS

| | | |
|---|---|---|
| 2,206,057 | Skinner | July 2, 1940 |
| 2,603,949 | Brown | July 22, 1952 |
| 2,711,630 | Lehman | June 28, 1955 |
| 2,724,237 | Hickman | Nov. 22, 1955 |
| 2,799,987 | Chandler | July 23, 1957 |

FOREIGN PATENTS

| | | |
|---|---|---|
| 596,300 | Germany | Apr. 30, 1934 |
| 598,235 | Germany | June 7, 1934 |
| 590,177 | Great Britain | July 10, 1947 |
| 669,014 | Great Britain | Mar. 26, 1952 |